(12) United States Patent
Pesar (10) Patent No.: US 8,937,734 B2
(45) Date of Patent: Jan. 20, 2015

(54) SYSTEM AND METHOD FOR CREATING A URL SHORTCUT NAME CORRESPONDING TO A WEB PAGE AND PRINTING THE WEB PAGE WITH THE SHORTCUT NAME

(75) Inventor: Robert J. Pesar, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1494 days.

(21) Appl. No.: 12/029,102

(22) Filed: Feb. 11, 2008

(65) Prior Publication Data

US 2009/0201532 A1 Aug. 13, 2009

(51) Int. Cl.
*G06F 3/12* (2006.01)
*G06K 15/00* (2006.01)
*G06F 15/16* (2006.01)
*G06F 3/00* (2006.01)
*G06F 3/048* (2013.01)
*G06F 17/30* (2006.01)

(52) U.S. Cl.
CPC .............................. *G06F 17/30887* (2013.01)
USPC ........ 358/1.15; 358/1.17; 358/1.18; 709/203; 709/217; 709/218; 709/219; 715/740; 715/780; 715/789; 715/847

(58) Field of Classification Search
USPC ............ 358/1.15, 3.23, 1.16, 1.18, 403, 1.17; 719/203, 217–219; 715/740, 780, 789, 715/847
See application file for complete search history.

(56) References Cited

U.S. PATENT DOCUMENTS

| | | | |
|---|---|---|---|
| 6,034,680 A * | 3/2000 | Kessenich et al. ............. | 715/733 |
| 6,185,588 B1 * | 2/2001 | Olson-Williams et al. ... | 715/236 |
| 6,791,703 B1 * | 9/2004 | Maeda et al. ................. | 358/1.15 |
| 6,928,620 B1 * | 8/2005 | Crangle et al. ................ | 715/769 |
| 7,000,001 B2 * | 2/2006 | Lazaridis ....................... | 709/217 |
| 7,073,119 B2 * | 7/2006 | Matsubayashi et al. ...... | 715/234 |
| 7,199,893 B2 * | 4/2007 | Uchiyama et al. ............ | 358/1.15 |
| 7,274,474 B2 * | 9/2007 | Yamaguchi et al. .......... | 358/1.15 |
| 7,307,745 B2 * | 12/2007 | Tanaka .......................... | 358/1.15 |
| 7,475,345 B2 * | 1/2009 | Ohara ............................ | 715/273 |
| 7,483,160 B2 * | 1/2009 | Aoki et al. .................... | 358/1.15 |
| 7,617,446 B2 * | 11/2009 | Dutta ............................. | 715/234 |
| 8,330,976 B2 * | 12/2012 | Yamaguchi et al. .......... | 358/1.15 |
| 8,547,572 B2 * | 10/2013 | Tsuboi .......................... | 358/1.15 |
| 2003/0048470 A1 * | 3/2003 | Garcia .......................... | 358/1.15 |
| 2004/0046987 A1 * | 3/2004 | Mima ........................... | 358/1.14 |
| 2004/0066531 A1 * | 4/2004 | Kim .............................. | 358/1.15 |
| 2006/0156229 A1 * | 7/2006 | Morgan ........................ | 715/527 |

* cited by examiner

*Primary Examiner* — Firmin Backer
*Assistant Examiner* — Jonathan Beckley
(74) *Attorney, Agent, or Firm* — MH2 Technology Law Group LLP (57) ABSTRACT

A system and method are provided for creating a URL shortcut name corresponding to a web page and printing the web page with the shortcut name. The system includes a printer in operative communication with a processor configured for accessing a network and the at least one web page identifiable by a corresponding URL; a memory storing a shortcut name corresponding to the URL; and at least one application software module having a set of programmable instructions configured for execution by the processor for enabling said printer to print the shortcut name on a web page printout corresponding to the at least one web page. The system further enables providing the shortcut name in an URL address window of a network browser, determining the corresponding URL from the shortcut name, and accessing the at least one web page using the determined URL.

20 Claims, 5 Drawing Sheets

SYSTEM AND METHOD FOR CREATING A URL SHORTCUT NAME CORRESPONDING TO A WEB PAGE AND PRINTING THE WEB PAGE WITH THE SHORTCUT NAME

BACKGROUND

1. Technical Field

The present disclosure relates to uniform resource locators (URLs) and, more particularly, to a system and method for creating a URL shortcut name corresponding to a web page and printing the web page with the URL shortcut name.

2. Description of Related Art

Uniform resource locaters, commonly known in the art and hereinafter referred to as URLs, are simple and extensible means for identifying a resource (e.g., a web page). When a user prints a web page, the printed web page or printout typically includes on a lower margin of the printout the URL corresponding to the printed web page. At a later time, a user may access the web page, which corresponds to the printed web page, by typing into a URL address window of an internet browser the URL associated with the printed web page and displayed by the printed web page. The internet browser then navigates the internet and accesses the web page corresponding to the URL typed into the URL address window and displayed by the printed web page. Therefore, accessing a previously accessed web page by typing the URL displayed by a printout of a printed web page is a relatively simple task.

However, more often than not, the URL displayed by the printed web page includes many alphanumeric characters and symbols. Therefore, the process of typing the URL into the URL address window can be a tedious task which is prone to typing mistakes.

Additionally, if the URL is a long string of characters, the URL is generally truncated on the printout, in order that it is displayed by one line on the printout. Therefore, a user will not know the complete URL address at a later time unless he wrote it or saved it in memory.

SUMMARY

In accordance with the present disclosure, there is provided a system and method for creating a URL shortcut name corresponding to a web page and printing the web page with the URL shortcut name. The system includes a computing device adapted for connecting to the internet via an internet browser. The computing device may be a personal computer, PDA, cell phone, a multifunction device, such as the Xerox® Phaser™ 6180MFD, or other computing device having an internet browser and associated hardware for accessing the internet.

The system also includes a printer in operative communication with the computing device or integrated with the computing device capable of printing the web page with the URL shortcut name. The computing device includes application software modules having a set of programmable instructions capable of being executed by at least one processor of the computing device for performing various functions. These functions include enabling a user to create the URL shortcut name for the URL corresponding to a web page capable of being accessed by the computing device via the internet browser. The software modules further enable the URL shortcut name to be printed on a web page printout printed by the printer. Additionally, the software modules enable the computing device to store in memory the URL shortcut name and the corresponding URL in one or more data structures, e.g., one or more lookup tables.

In accordance with the present disclosure, the internet browser is capable of receiving the URL shortcut name upon being provided in a URL address window of the internet browser. The system then determines a URL corresponding to the received URL shortcut name by accessing at least one of the data structures. The determined URL is then provided to the internet browser for accessing a web page corresponding to the determined URL.

The present disclosure further provides a computer-readable medium, such as a CD-ROM, hard disk, etc., storing the application software modules capable of being provided to the computing device for performing the functions described herein in accordance with the present disclosure.

BRIEF DESCRIPTION OF THE DRAWINGS

Various embodiments of the present disclosure will be described herein below with reference to the figures wherein:

FIG. 2B illustrates a web page printout having a truncated URL in accordance with the prior art;

DETAILED DESCRIPTION

The present disclosure provides a system having application software modules having a set of programmable instructions capable of being executed by a processor of the system for creating a URL shortcut name corresponding to a web page and printing the web page with the URL, shortcut name using a printer. The application software modules are also capable of performing other functions described herein in accordance with the present disclosure.

The word "printer" is defined herein to mean any device capable of producing a reproduction of a web page, e.g., virtual (non-hard copy) reproduction (e.g., Adobe Distiller), hard copy reproduction (e.g., Xerox® Phaser™ 6180MFD), etc. The term "printout" is defined herein to mean any reproduction, e.g., virtual (non-hard copy reproduction), hard copy reproduction, etc., of a web page.

Figure 1:
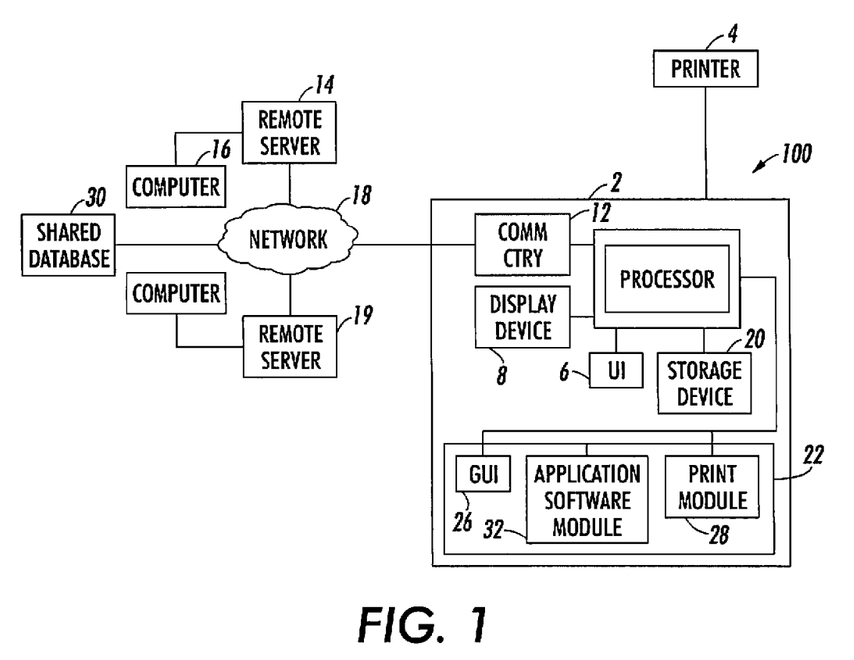
FIG. 1 is a block diagram of a system for creating a URL shortcut name corresponding to a web page and printing the web page with the URL shortcut name in accordance with the present disclosure.

With reference to FIG. 1, there is shown a block diagram of an exemplary system 100 in accordance with the present disclosure. System 100 includes a computing device 2. Computing device 2 may be a personal computer, PDA, cell phone, multifunction device, such as the Xerox® Phaser™ 6180MFD, or other computing device having a network browser, e.g., an internet browser, and associated hardware for accessing the internet or other network.

Computing device 2 includes one or more processing modules 10 (processor 10) capable of executing instructions associated with the application software modules and/or system hardware modules. Processing module 10 includes a processing unit or CPU and a memory. The memory 10 is generic and may comprise RAM, ROM, CD-ROM, or other storage such as hard disk, magnetic tape, and the like. Other devices for accepting, capturing and storing data are well known and the above list should not be construed as exhaustive.

Computing device 2 is operably connected to a printer 4 having the capability of printing or reproducing, inter alia, in response to receiving a print request from the computing device 2, a printout of a web page accessed by the computing device 2 via the internet using an internet browser and associated communication circuitry and/or hardware 12. The computing device 2 includes one or more user interface devices 6 (such as a keyboard) and a display device 8.

Computing device 2 includes application software that allows the computing device to connect to an internet web browser by way of the communication circuitry 12. Communication circuitry 12 provides communication between processor 10 of computer 2 and a remote server 14 and/or other computers 16, e.g., via network 18, where network 18 may be the Internet, an intranet, LAN, WAN, etc.

Computing device 2 includes one or more storage devices 20 which are accessible by the processor 10. The one or more storage devices 20 or a portion thereof may be removable or external from computing device 2. The one or more storage devices 20 include one or more types of storage devices and/or data structures such as a hard disk drive, RAM, ROM, CD-ROM, DVD, and flash memory.

A plurality of software modules 22 are stored on the one or more storage devices 20, where each software module has a set of programmable instructions executable by the processor 10 for performing the functions disclosed herein. The functions of the respective software modules may be combined into one or more modules or distributed among a different combination of modules.

The plurality of software modules 22 includes an application software module 32 (software 32). Software 32, and executable instructions associated therewith, is configured to create one or more URL shortcuts 200 (shortcut 200), subsequently store shortcut 200 into a memory (e.g., data structure) and access shortcut 200 at a later time such that shortcut 200 may be provided into the address bar of an internet browser. Software 32 is configured to communicate with other application software and/or hardware, such as, for example, application software and/or hardware associated with an internet browser. Having software 32 configured in such a manner allows the internet browser to determine which URL corresponds to the shortcut 200 provided in the internet browser's address bar.

Software 32 may be preloaded and stored into a memory, e.g., RAM, of computing device 2. Conversely, software 32 may be purchased and loaded into a memory of computing device 2. In this instance, software 32 may be manufactured and distributed through retail stores, or the like on a per unit basis. Here, software 32 may be sold on any suitable computer readable medium capable of storing data. Suitable computer readable medium include but are not limited to floppy disks, compact dicks, flash memory, hard disk drive, etc. Alternatively, software 32 may be purchased by way of the internet, downloaded, and subsequently stored into a memory of an appropriate computing device, such as, for example, computing device 2.

Software 32 communicates with system and application software via communication circuitry associated with computing device 2. Software 32 and instructions associated therewith are executable by the processor 10.

Adapted to create shortcut 200, software 32 is in operative communication with, or may include one or more graphical user interface modules 26, and one or more suitable user interface devices 6 (e.g., keyboard 6). Software 32, module 26, and keyboard 6 may be configured in such a manner that a user can create an arbitrary shortcut name 200 and enter shortcut name 200 into one or more graphical user interfaces (GUIs). Shortcut 200 may be readable text, graphics or any combination thereof configured in such a manner that a user may easily identify shortcut 200 with a specific URL. In its simplest form, shortcut 200 consists of alphanumeric characters and/or symbols, e.g., "Phaser™ 6180MFD".

Software 32 may operate in automatic and/or manual modes of operation. In manual mode, software 32 may be selectively enabled, for example, by pointing and clicking on an appropriate icon, wherein a GUI may prompt a user to create shortcut 200, which then may be subsequently stored into a memory (e.g., data structure). In automatic mode, software 32 may be configured to automatically prompt a user to create a URL shortcut upon receiving a command to generate a print request to print a web page. In this instance, GUI may prompt a user to create shortcut 200, which then may be subsequently stored into a memory (e.g., data structure). Automatic mode of operation may also be selectively disabled.

Software 32 is configured to enable a user to create shortcut 200 for a URL corresponding to a web page. This may be accomplished by any suitable means known in the art. Shortcut 200 may be created by providing alphanumeric characters and/or symbols into a memory (e.g., a data-structure). With this purpose in mind, software 32 includes one or more GUIs. GUIs operably associated with software 32 may include but are not limited to function icons, drop down menus, drop-down lists, look-up tables, windows, pointers, text-boxes, buttons, hyper links, check boxes, data-grids and so on. The GUIs may operate in conventional fashion. That is, a cursor can be placed on the icon and/or field associated with the GUI, and by clicking (or double-clicking) a mouse, trackball or other button the GUI may become operational. For the remainder of the disclosure, and unless otherwise noted, it will be assumed that the shortcuts and/or URLs, as described herein, are typed into an appropriate field of the GUIs. Those skilled in the art will appreciate other methods of entering the URL shortcuts. For example, cutting and pasting, dragging and clicking, and so on are all methods of entering the URL shortcuts and/or URLs corresponding thereto that are within the purview of the present disclosure.

Figure 2A:
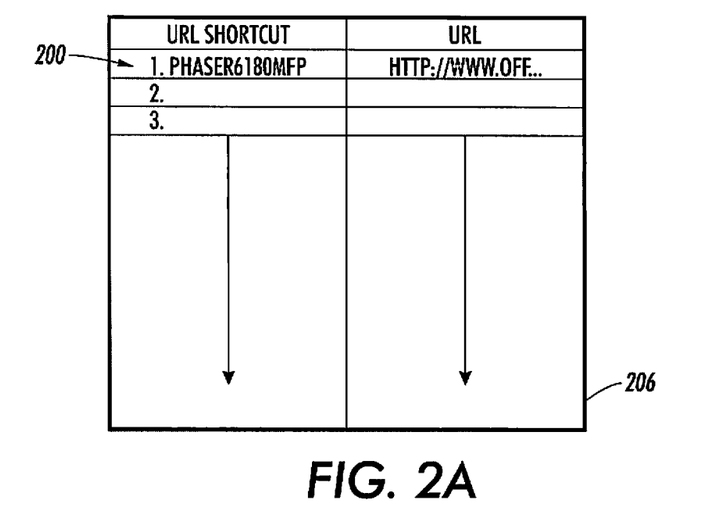
FIG. 2A illustrates a GUI having a URL shortcut creation window in accordance with the present disclosure.

With reference to FIG. 2A, there is shown a GUI 206 in accordance with the present disclosure. As shown, GUI 206 is in the form of window that includes an editable data look-up table or other suitable GUI. As used herein, an editable data look-up table is defined as any data look-up table that is capable of altering, adapting, or refining any suitable alphanumeric characters and/or symbols.

GUI 206 may be employed to edit, and/or delete one or more previously created and/or stored URL shortcuts. Having a GUI configured in such a manner provides an easy means for viewing, editing, deleting and/or adding URL shortcuts. GUI 206 includes any number of editable rows, columns, and/or fields 202. Each of the rows, columns, and/or fields 202 may be configured to receive any suitable amount of alphanumeric characters and symbols. As illustrated in the FIGS., "Phaser™ 6180 MFD" may be provided into field 202 of GUI 206. The corresponding URL may also be provided to GUI 206. As mentioned above, because a URL is generally a very long string of alphanumeric characters and/or symbols, providing the URL into GUI 206 may be more easily achieved by way of cutting and pasting.

Figure 2B:
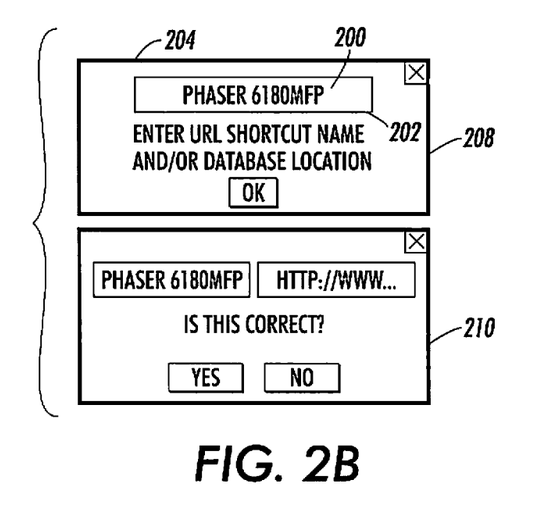
FIG. 2B illustrates another GUI having a URL shortcut creation window in accordance with the present disclosure.

FIG. 2B illustrates another type of GUI in accordance with the present disclosure. GUI 208 may be configured to operate in the same or similar manner as GUI 206. As shown, GUI 208 may be in the form of a window 204 and may include any number of other suitable GUIs and/or fields 202. Shortcut 200 may be entered into one or more fields 202 of window 204 in manner as previously described above.

Shortcut 200 may be checked for errors (e.g., spelling). To this end, either of the aforementioned GUIs may be configured to display subsequent GUIs. For example, a second, subsequent GUI 210 may be configured to display shortcut name 200 and/or the corresponding URL for reviewing before storing and/or printing shortcut 200.

Because a URL shortcut name may be created at a remote location, any of the aforementioned GUIs each may be configured to receive other information that will facilitate retrieving the URL shortcut at a later time. For example, a remote shared database 30 including the shared database name 210 associated therewith may be entered into any of the previously described GUIs. With this purpose in mind, remote shared database 30 may be entered into a separate field (not explicitly shown) within the GUI, or, alternatively, remote shared database 30 may be entered as part of the alphanumeric text of shortcut 200.

Configured to store, print and retrieve a shortcut 200, which is accessible at a later time by a user, software 32 transmits shortcut 200 to a memory of one or more of the above described storage devices 20 (e.g., data structure in the form of a data look-up table). Other suitable memory in which shortcut 200 may be stored includes but is not limited to memory associated with remote shared database 30, e.g., a shared database accessible by a user from a remote location. In embodiments, after shortcut 200 is created it may be stored into a memory and accessible by way of one of the internet browser's GUIs (e.g., internet browser "Favorites").

Software 32 is configured such that shortcut 200 is displayed on a printed web page. With this purpose in mind, software 32 is in operative communication with one or more print drivers associated with one or more printers 4 by way of print module 28. Shortcut 200 is accessible to print module 28 such that at a time prior to printing a web page, print module 28 accesses shortcut 200 from one of the previously described memory and transmits shortcut 200 to printer 4. In an embodiment, print module 28, transmits shortcut 200 to printer 4 so that it can be stored in electronic form and added to a document, e.g., printed on the web page printout.

Print module 28 interfaces with printer 4 via a print driver associated therewith. Print module 28 receives a print command from processor 10 and transmits the print command to printer 4.

Printer 4 may be controlled by its own dedicated processing device. Alternatively, printer 4 may be controlled by any other suitable processing device, e.g., processor 10. Printer 4 may be any suitable printer including but not limited to toner based (e.g., xerographic), ink jet, etc.

Figure 2C:
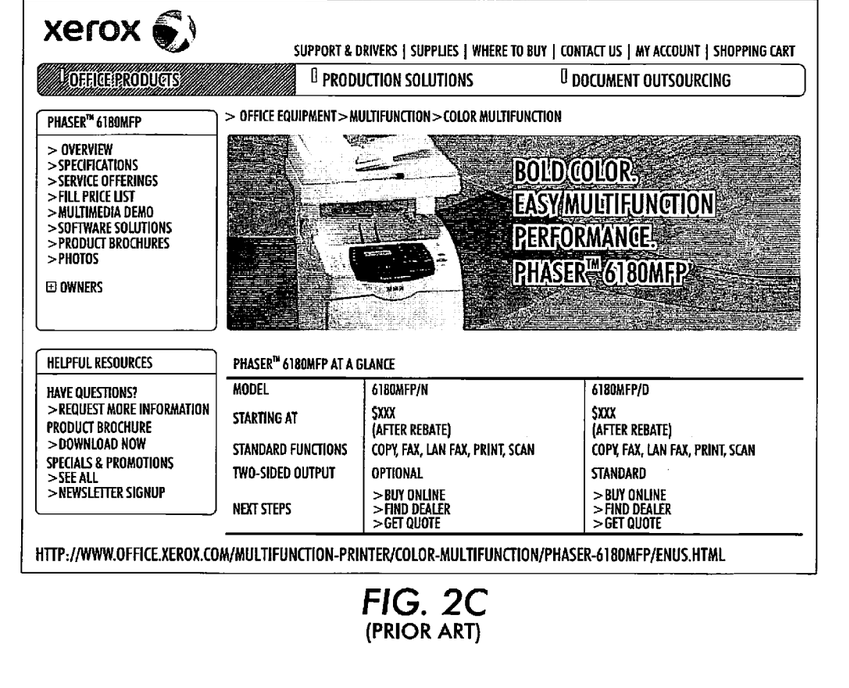
FIG. 2C illustrates a web page printout having the URL shortcut name in accordance with the present disclosure.

FIG. 2C illustrates a printed prior art web page. As shown, the URL associated with the web page is a long string of alphanumeric characters and symbols. As mentioned above, retyping this URL, can be a tedious task which is prone to typing mistakes.

Figure 2D:
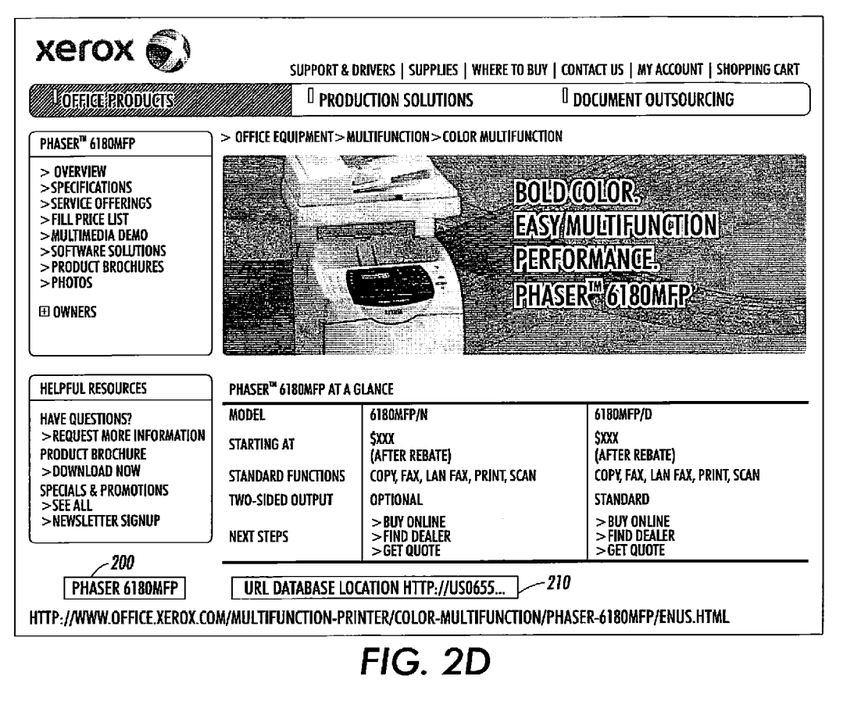

FIG. 2D shows one illustration of shortcut 200 displayed on a printed web page in accordance with the present disclosure. The specific alphanumeric characters and/or symbols that may be used to associate a shortcut 200 with a corresponding URL are a matter of preference. For illustrative purposes, the shortcut 200 is shown as alphanumeric text that recites the term "Phaser™ 6180 MFD". As mentioned above, shortcut 200 may include information other than the URL, e.g., remote shared database 30 and/or shared database name 210 associated therewith. Shortcut 200 may be printed within any suitable area of the page. By way of example only, shortcut 200 is shown in the lower right hand margin of the page.

Software 32 is configured such that that when shortcut 200 is provided to the address bar of an internet browser, the web page corresponding to the URL is accessed. To this end, processor 10 and/or application software associated with the internet browser may be configured to recognize when shortcut 200 is entered into the address bar of the internet browser. Upon recognition of shortcut 200 being provided to the address bar of the internet browser, processor 10 accesses one or more data structures, e.g., one or more lookup tables stored in memory, and determines the corresponding URL. The determined URL is then provided to the internet browser for accessing the corresponding web page. In an embodiment, a GUI (not explicitly shown) may be configured to display the URL prior to accessing the web page corresponding to the URL.

Any of the above described modules and/or devices may also include additional programmable instructions capable of being executed by the processor 10 for performing other functions.

A brief description of one example in which the shortcut 200 is operationally used now follows. The following example is for illustrative purposes only and should not be construed as limiting.

In operation, a user interested in purchasing a multi-function device (MFD) for her workplace is browsing the web for suitable MFDs. The user accesses a web page corresponding to a manufacture of MFDs. The user reviews different models and finds a suitable MFD, such as, for example, the MFD commercially available by Xerox® and sold under the trademark Phaser™ and having model reference code 6180MFP. Having found a suitable MFD, the user wants to print the web page for review at a later time. From the web browser the user may navigate to File/Print/Properties, wherein the user selects the desired printer, e.g., printer 4. Software 32, running in the background and set for automatic operation, detects the print request from the internet browser. Software 32 transmits a signal to processor 10 to display a GUI, e.g., window 208 configured to enable a user to enter text by way of keyboard 6 (FIG. 2B). Into one or more suitable fields 202 of GUI 208, a user types in a suitable shortcut 200, e.g., Phaser™ 6180MFP, and selects O.K. A second GUI may be displayed, which may prompt a user, for example, to review the shortcut 200 and click O.K. upon approval. Software 32 stores the shortcut 200 into a memory, wherein it is now accessible at a latter time. Software 32 also transmits shortcut 200, via printer module 28, to printer 4 where it can be stored in electronic form and subsequently displayed on the web page, see FIG. 2D. In the instance where shortcut 200 is to be stored in a remote shared database 30, the database location may also be added to the shortcut 200, see FIG. 2D. At a later time, a user can access the previously viewed web page, by reviewing the printed web page, and obtaining the shortcut 200. The user can then provide shortcut 200 to the internet browser address bar, e.g., typing, pasting, and so on. Processor 10 of computing device 2, configured to retrieve the corresponding URL, searches one or more data structures, e.g., one or more lookup tables stored in memory, determines the corresponding URL and access the web page corresponding to the URL, e.g., the web page describing the Phaser™ 6180MFP.

If, at a latter time, a user wishes to review, update, edit, and/or delete any of the one or more previously created and/or stored URL shortcuts, a user may click on an appropriate icon associated with software 32 and bring up a GUI, such as, for example, GUI 206. Here, a user may review, update, edit, and/or delete one or more of the previously created shortcuts 200.

From the foregoing and with reference to the various figure drawings, those skilled in the art will appreciate that certain modifications can also be made to the present disclosure without departing from the scope of the same. The concept of including a shortcut of a URL to a web page to be printed can be extended to other print documents. For example, software 32 may be configured to operate as described above, however, instead of providing a shortcut into the address bar of an internet browser, a shortcut may be provided into the address bar of other application software, such as, for example, the address bar of any suitable file system.

Figure 3A:
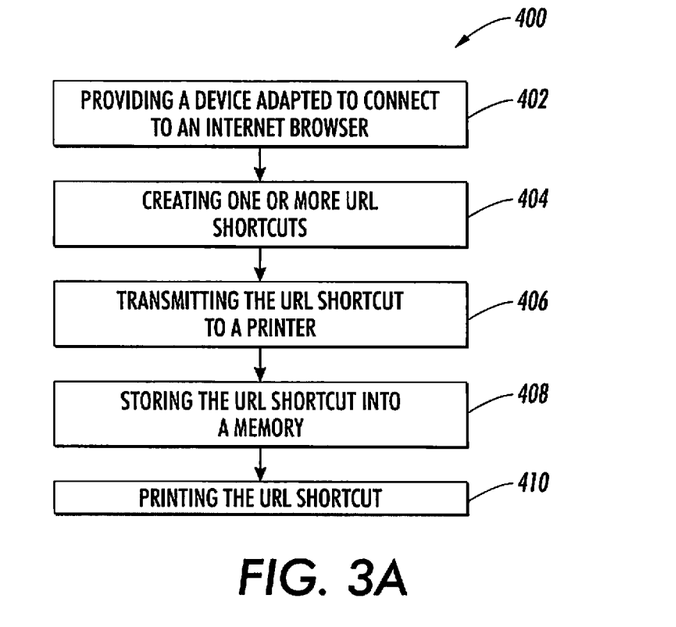
FIG. 3A is a flow chart illustrating a method for creating a URL shortcut name corresponding to a web page and printing the web page with the URL shortcut name in accordance with the present disclosure.

With reference to FIG. 3A there is shown a flow chart 400 illustrating a method of creating a shortcut of web page. At step 402, a computer 2 adapted to connect to an internet browser is provided. At step 404, a shortcut 200 is created. The shortcut 200 may be created upon receiving a command to generate a print request from an internet browser, and thereafter the shortcut is stored into a memory. Alternatively, shortcut 200 may be created prior to requesting a print command and subsequently stored into a memory. At step 406, shortcut 200 is transmitted to a printer 4. At step 408, the shortcut 200 is stored into one or more memory 20. And at step 410, the shortcut 200 is printed.

The above steps are just one sequence of steps in accordance with the present disclosure. Those skilled in the art will appreciate that steps 402-412 may be carried out in a plethora of different, yet suitable, sequences. For example, step 408 may be performed prior to step 406.

Figure 3B:
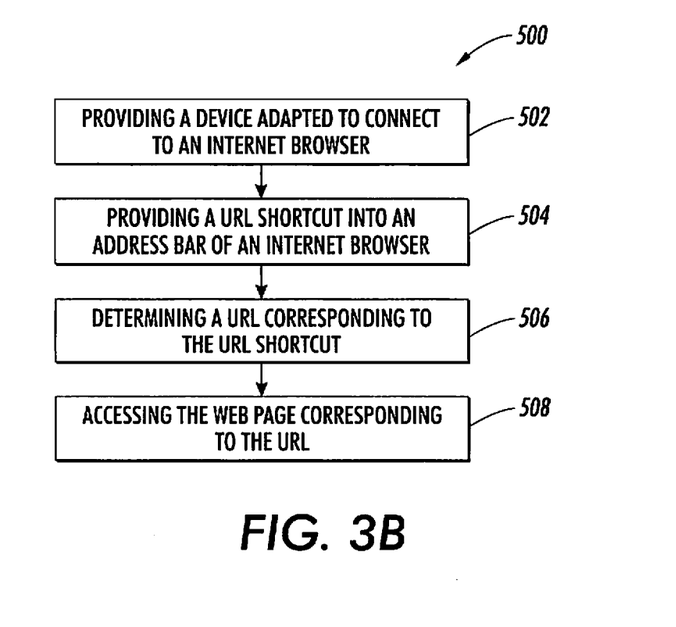
FIG. 3B is a flow chart illustrating a method for accessing a web page corresponding to a URL shortcut name provided to a URL address window of an internet browser in accordance with the present disclosure.

With reference to FIG. 3B there is shown a method 500 for accessing a web page corresponding to a URL shortcut name provided to a URL address window of an internet browser in accordance with the present disclosure. At step 502, a computing device 2 adapted to connect to an internet browser is provided. At step 504, a shortcut 200 is provided into the address bar of an internet browser. At step 506, computing device 2 searches a memory and determines a URL corresponding to the shortcut 200 provided in the address bar of the internet browser. At step 508, the web page corresponding to the URL is accessed.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system comprising:
one or more memory devices storing one or more instructions; and
one or more processors coupled to the one or more memory devices, wherein the one or more processors are configured to execute the one or more instructions to perform a method comprising:
receiving, from a first device, a request to associate user generated textual data with a URL, wherein:
the user generated textual data:
was generated based on a user request to print a document corresponding to at least one web page;
is based on textual input of the user; and
is not the URL; and
a web page printout is printed using one or more printers and the web page printout comprises a representation of the at least one web page and the user generated textual data;
storing an association of the user generated textual data with the URL in a lookup table;
receiving, from a second device, a request for the URL associated with the user generated textual data, wherein the request was generated on the second device in response to a user of the second device entering the user generated textual data into an address bar of a web browser on the second device;
retrieving, via the lookup table, the URL associated with the user generated textual data; and
transmitting the URL to the second device, wherein the second device retrieves the at least one web page using the URL.

2. The system according to claim 1, wherein the one or more printers are xerographic printers.

3. The system according to claim 1, wherein the textual input of the user is received via a graphical user interface on a display device of the first device.

4. The system according to claim 1, the method further comprising:
receiving from the first device, a request to associate a second user generated textual data with a second URL, wherein the second user generated textual data was not generated based on a user print request; and
storing an association of the second user generated textual data with the second URL in the lookup table.

5. The system according to claim 1, wherein the web page printout further comprises URL-related information corresponding to the user generated textual data.

6. The system according to claim 5, wherein said URL-related information includes a location of the lookup table.

7. The system according to claim 6, wherein the request for the URL associated with the user generated textual data was generated on the second device further in response to the user of the second device entering the location of the lookup table.

8. The system according to claim 1, wherein the user generated textual data comprises an indication of a location of the lookup table.

9. The system according to claim 8, wherein the request for the URL associated with the user generated textual data was generated by the second device determining the location of the lookup table from the indication of the location in the user generated textual data.

10. A method comprising:
receiving, from a first device a request to associate user generated textual data with a URL, wherein:
the user generated textual data:
was generated based on a user request to print a document corresponding to at least one web page;
is based on textual input of the user; and
is not the URL; and
a web page printout is printed using one or more printers and the web page printout comprises a representation of the at least one web page and the user generated textual data;
storing an association of the user generated textual data with the URL in a lookup table;

receiving, from a second device, a request for the URL associated with the user generated textual data, wherein the request was generated on the second device in response to a user of the second device entering the user generated textual data into an address bar of a web browser on the second device;

retrieving, via the lookup table, the URL associated with the user generated textual data; and transmitting the URL to the second device, wherein the second device retrieves the at least one web page using the URL.

11. The method according to claim 10, wherein the web page printout further comprises URL-related information corresponding to the user generated textual data.

12. The method according to claim 11, wherein said URL-related information includes a location of the lookup table.

13. The method according to claim 12, wherein the request for the URL associated with the user generated textual data was generated on the second device further in response to the user of the second device entering the location of the lookup table.

14. The method according to claim 10, wherein the textual input of the user is received via a graphical user interface for entering said textual input on the first device.

15. The method according to claim 10, further comprising:
receiving, from the first device, a request to associate a second user generated textual data with a second URL, wherein the second user generated textual data was not generated based on a user print request; and
storing an association of the second user generated textual data with the second URL in the lookup table.

16. The method according to claim 10, wherein the user generated textual data comprises an indication of a location of the lookup table.

17. The method according to claim 16, wherein the request for the URL associated with the user generated textual data was generated by the second device determining the location of the lookup table from the indication of the location in the user generated textual data.

18. A non-transitory computer readable medium storing a series of programmable instructions configured for execution by at least one processor for providing a method comprising:
receiving, from a first device, a request to associate user generated textual data with a URL, wherein:
the user generated textual data:
was generated based on a user request to print a document corresponding to at least one web page;
is based on textual input of the user; and
is not the URL; and
a web page printout is printed using one or more printers and the web page printout comprises a representation of the at least one web page and the user generated textual data;
storing an association of the user generated textual data with the URL in a lookup table;
receiving, from a second device, a request for the URL associated with the user generated textual data, wherein the request was generated on the second device in response to a user of the second device entering the user generated textual data into an address bar of a web browser on the second device;
retrieving, via the lookup table, the URL associated with the user generated textual data; and
transmitting the URL to the second device, wherein the second device retrieves the at least one web page using the URL.

19. The non-transitory computer readable medium according to claim 18, wherein the user generated textual data comprises an indication of a location of the lookup table.

20. The non-transitory computer readable medium according to claim 19, wherein the request for the URL associated with the user generated textual data was generated by the second device determining the location of the lookup table from the indication of the location in the user generated textual data.

* * * * *